United States Patent
Khan et al.

(10) Patent No.: US 9,758,960 B2
(45) Date of Patent: Sep. 12, 2017

(54) RADIANT BARRIER

(71) Applicant: Gardner-Gibson, Inc., Tampa, FL (US)

(72) Inventors: Amir G. Khan, Tampa, FL (US); Sean Hyer, Tampa, FL (US)

(73) Assignee: GARDNER-GIBSON, INC., Tampa, FL (US)

( * ) Notice: Subject to any disclaimer, the term of this patent is extended or adjusted under 35 U.S.C. 154(b) by 774 days.

(21) Appl. No.: 13/793,301

(22) Filed: Mar. 11, 2013

(65) Prior Publication Data

US 2014/0256200 A1    Sep. 11, 2014

(51) Int. Cl.
*E04B 1/78* (2006.01)
*B32B 37/20* (2006.01)
(Continued)

(52) U.S. Cl.
CPC .............. *E04B 1/78* (2013.01); *B32B 5/024* (2013.01); *B32B 5/028* (2013.01); *B32B 7/12* (2013.01); *B32B 15/082* (2013.01); *B32B 15/085* (2013.01); *B32B 15/20* (2013.01); *B32B 27/08* (2013.01); *B32B 27/12* (2013.01); *B32B 37/203* (2013.01); *E04D 12/002* (2013.01); *B32B 37/1284* (2013.01); *B32B 37/153* (2013.01); *B32B 2255/02* (2013.01); *B32B 2255/10* (2013.01); *B32B 2255/205* (2013.01); *B32B 2262/0253* (2013.01); *B32B 2262/0269* (2013.01); *B32B 2262/0276* (2013.01); *B32B 2262/101* (2013.01); *B32B 2262/14* (2013.01); *B32B 2270/00* (2013.01); *B32B 2307/304* (2013.01); *B32B 2307/416* (2013.01); *B32B 2307/71* (2013.01); *B32B 2307/7246* (2013.01); *B32B 2309/105* (2013.01);
(Continued)

(58) Field of Classification Search
CPC ..... B32B 15/082; B32B 15/085; B32B 15/20; B32B 2255/02; B32B 2255/10; B32B 2255/205; B32B 2262/0253; B32B 2262/0269; B32B 2262/0276; B32B 2262/101; B32B 2262/14; B32B 2270/00; B32B 2307/304; B32B 2307/416; B32B 2307/71; B32B 2307/7246; B32B 2309/105; B32B 2311/24; B32B 2315/085; B32B 2398/20; B32B 2419/00; B32B 2419/06; B32B 27/08; B32B 27/12; B32B 37/1284
See application file for complete search history.

(56) References Cited

U.S. PATENT DOCUMENTS

| 8,925,272 | B1* | 1/2015 | Amatruda | ................. E04D 1/26 52/557 |
| 2004/0009319 | A1* | 1/2004 | Zanchetta | ................ B32B 9/00 428/40.1 |

(Continued)

Primary Examiner — Arti Singh-Pandey
(74) Attorney, Agent, or Firm — Greenberg Traurig, LLP

(57) ABSTRACT

A radiant barrier has a layer of a flexible polymer, such as TPO, and a layer of metallic aluminum bonded thereto. A reinforcement layer, such as a fiberglass scrim, and a layer of adhesive, such as EVA, may be used to strengthen the barrier and prevent de-lamination. LDPE may be incorporated into the TPO to increase strength. The barrier may also be a moisture barrier. The layers may be laminated by a heated roll set and the aluminum applied by vapor deposition.

17 Claims, 2 Drawing Sheets

(51) Int. Cl.
*E04D 12/00* (2006.01)
*B32B 5/02* (2006.01)
*B32B 7/12* (2006.01)
*B32B 15/082* (2006.01)
*B32B 15/085* (2006.01)
*B32B 15/20* (2006.01)
*B32B 27/08* (2006.01)
*B32B 27/12* (2006.01)
*B32B 37/12* (2006.01)
*B32B 37/15* (2006.01)
*E04B 1/76* (2006.01)

(52) U.S. Cl.
CPC ..... *B32B 2311/24* (2013.01); *B32B 2315/085* (2013.01); *B32B 2398/20* (2013.01); *B32B 2419/00* (2013.01); *B32B 2419/06* (2013.01); *E04B 2001/7691* (2013.01); *Y10T 156/10* (2015.01); *Y10T 428/263* (2015.01); *Y10T 428/264* (2015.01); *Y10T 428/31678* (2015.04); *Y10T 428/31692* (2015.04); *Y10T 428/31699* (2015.04); *Y10T 442/10* (2015.04)

(56) References Cited

U.S. PATENT DOCUMENTS

| | | | |
|---|---|---|---|
| 2008/0289682 A1* | 11/2008 | Adriani | H01L 31/048 136/251 |
| 2010/0003505 A1* | 1/2010 | Yoon | B32B 27/08 428/335 |
| 2011/0036494 A1* | 2/2011 | Keenihan | B29C 67/0044 156/285 |
| 2011/0091675 A1* | 4/2011 | Simpson | B32B 37/02 428/40.3 |
| 2013/0247490 A1* | 9/2013 | Strait | E04D 12/002 52/302.1 |

* cited by examiner

RADIANT BARRIER

FIELD

The present invention relates to barriers to radiation, and more particularly, to barriers to solar and infrared radiation for controlling the temperature in a structure.

BACKGROUND

Various types of materials for controlling the temperature in a structure are known, such as fiberglass, expanded foam and other types of insulation that are incorporated into structures such as homes and commercial structures. Notwithstanding, improvements in building materials and methods for making and using them remain desirable.

SUMMARY

The disclosed subject matter relates to a radiant barrier having a first layer of a flexible polymer and a second layer of metallic aluminum bonded to the first layer.

In accordance with another embodiment of the present disclosure, the first layer is thermoplastic polyolefin (TPO).

In accordance with another embodiment of the present disclosure, the radiant barrier has a reinforcement layer.

In accordance with another embodiment of the present disclosure, the reinforcement layer includes fiberglass.

In accordance with another embodiment of the present disclosure, the reinforcement layer further includes fibers made from at least one polymer.

In accordance with another embodiment of the present disclosure, the reinforcement layer contains fibers of at least two of fiberglass, polyester, polypropylene and Kevlar.

In accordance with another embodiment of the present disclosure, the reinforcement layer is 75 to 100 microns thick.

In accordance with another embodiment of the present disclosure, the TPO layer is 50 to 70 microns thick.

In accordance with another embodiment of the present disclosure, the aluminum layer is 1 to 50 microns thick.

In accordance with another embodiment of the present disclosure, the radiant barrier has an emissivity in the range of 0.01 to 0.09, a reflectivity of at least 80 at wavelengths of light in the range of 250 nm to 2500 um at an incidence angle of 20 degrees.

In accordance with another embodiment of the present disclosure, the radiant barrier has a layer of adhesive interposed between the first and second layers to promote adhesion there between.

In accordance with another embodiment of the present disclosure, the adhesive is ethyl vinyl acetate (EVA) and the radiant barrier has a layer of ethyl vinyl acetate (EVA) interposed between at least two of the first layer, the second layer and the reinforcement layer.

In accordance with another embodiment of the present disclosure, the TPO layer further includes a volume of low density polyethylene (LDPE) intermixed therewith in a percentage amount in the range of 10% to 25% by volume relative to the volume of TPO.

In accordance with another embodiment of the present disclosure, the radiant barrier has a layer of low density polyethylene (LDPE) interposed between at least two of the first layer, the second layer, the reinforcement layer and the EVA layer.

In accordance with another embodiment of the present disclosure, the layer of TPO and the layer of LDPE are mixed to form an intermixed layer.

In accordance with another embodiment of the present disclosure, the radiant barrier is also a moisture barrier.

In accordance with another embodiment of the present disclosure, a method for making a radiant barrier, includes the steps of: providing a web of a polymer; providing an aluminum sheet; converging the web of polymer and the sheet of aluminum sheet at the nip of a roll set; applying heat and pressure at the nip; passing the converged web and the aluminum sheet through the nip of the roll set, whereby the polymer web and the aluminum sheet are laminated together.

In accordance with another embodiment of the present disclosure, the method of making a radiant barrier further includes providing a reinforcement scrim adjacent one side of the polymer web to form three adjacent layers prior to the step of passing, whereby the step of passing laminates the three adjacent layers together.

In accordance with another embodiment of the present disclosure, the method of making a radiant barrier further includes the step of applying an adhesive substance on at least one of the aluminum sheet, the polymer web and the scrim to make the resultant laminate more resistant to delamination.

In accordance with another embodiment of the present disclosure, a method of making a radiant barrier includes: providing a sheet of TPO; and coating the sheet of TPO with a layer of aluminum by vapor deposition.

BRIEF DESCRIPTION OF THE DRAWINGS

For a more complete understanding of the present disclosure, reference is made to the following detailed description of exemplary embodiments considered in conjunction with the accompanying drawings.

DETAILED DESCRIPTION OF EXEMPLARY EMBODIMENTS

Figure 1:
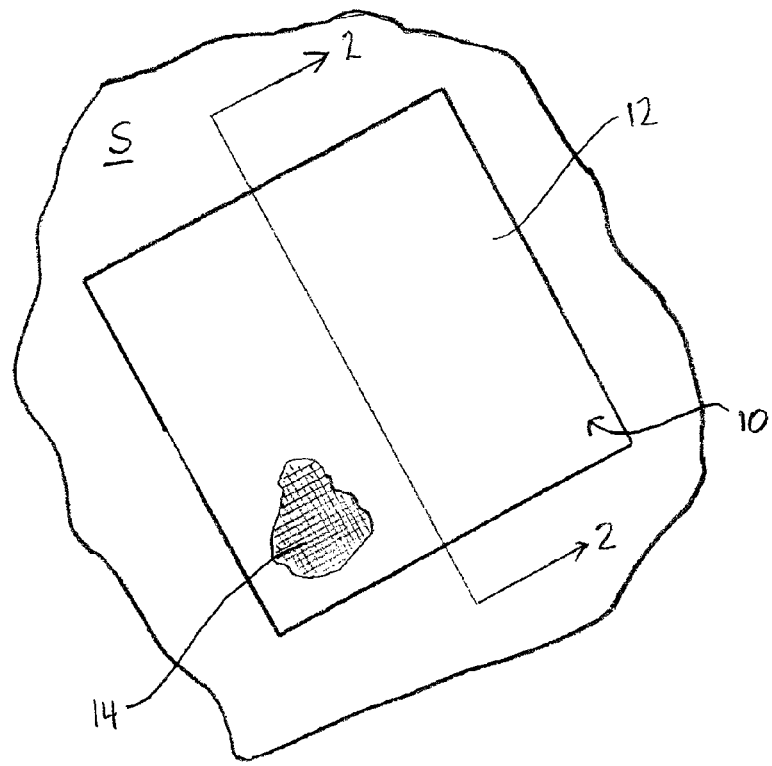
FIG. 1 is a diagrammatic perspective view of a radiant barrier in accordance with an embodiment of the present disclosure.

FIG. 1 shows a radiant barrier 10 disposed proximate a structure surface S. The surface S may be, e.g., the upper/outside or lower/underside of roof decking, such as, corrugated metal or plywood, of a structure. FIG. 1 illustrates that the radiant barrier 10 may be a composite or laminate of a plurality of material layers, e.g., a first layer 12 of a first material and a second layer 14 of a second material. In the instance where the radiant barrier 10 is disposed over the upper surface of roof decking, it could be attached to the decking, underlying or overlying a roofing underlayment material, such as tar paper or synthetic underlayments, peel and stick underlayments, felt paper, rosin paper etc., and retained in position by adhesive or fasteners, such as nails or staples. The radiant barrier 10 may itself be considered an underlayment layer, which may be used either with or independently of other underlayment materials, and which is overlaid by exterior roofing material, such as metal, slate, wood, tile, asphalt roll roofing or roofing shingles that are glued, riveted, screwed or nailed in place on the roof decking (surface S). A roofing construction, e.g., utilizing spaced furring strips, providing a space between the exterior roofing surface and the radiant barrier 10 may be used to facilitate heat rejection by the radiant barrier 10. The fastening of the overlying external roofing material, e.g., by nails, may be utilized to hold the radiant barrier 10 in position on the surface S. As a further alternative, the radiant barrier 10 may be affixed to the underside (inside) surface of roof decking, where it is held in place by adhesives, nails, staples or the like. While the foregoing examples relate to roofing, in that roofing is typically the area of a structure that receives a significant amount of solar radiation and is also a surface through which a significant amount of heat is lost from the interior of a building during cold seasons, the radiant barrier 10 may be applied to other surfaces of a building to aid in climate control. For example, the radiant barrier 10 may be applied to exterior or interior walls, where it can perform the functions of excluding heat, vapor and liquid, or heat and humidity control/retention, as described more fully below.

Figure 2:
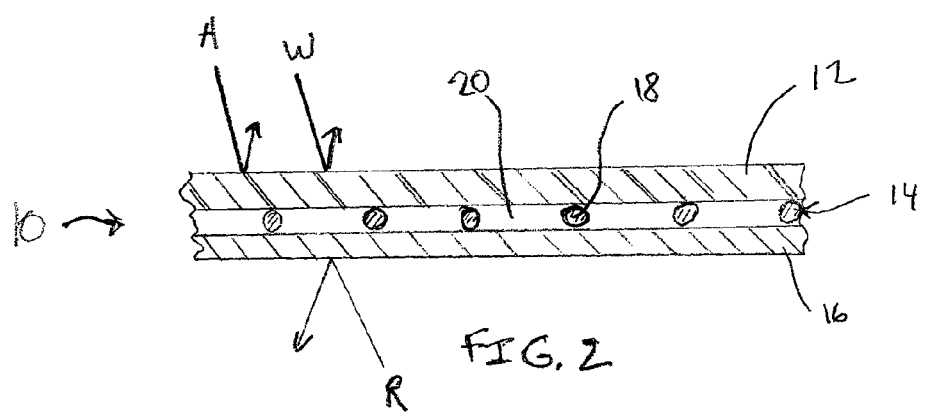
FIG. 2 is a cross-sectional view of the radiant barrier of FIG. 1, taken along section line 2-2 and looking in the direction of the arrows.

FIG. 2 shows that, in one embodiment, the radiant barrier 10 may have three layers 12, 14, 16, more particularly, a layer of thermoplastic polyolefin (TPO) 12, an intermediate layer of fibrous scrim 14, and a layer of aluminum foil 16. The layer of TPO 12 is typically formed as a thin, blown film of e.g., about 50 microns to about 70 microns in thickness. TPO films of this type may be obtained from blowing thermoplastic olefins, such as types and variations of polypropylene, ethylene, etc. and exhibit the properties of flexibility, ductility, moisture impenetrability and resistance to degradation from UV radiation. The scrim 14 may be formed from fiberglass and may be formed in a grid pattern of strands oriented at right angles. For example, the scrim 14, may be formed from fiberglass strands grouped in bundles 18 of about three to ten strands in number, with a first set of bundles extending generally parallel to one another and spaced about 5 or 6 mm apart and a second set of bundles 20 disposed generally perpendicularly to the first set of bundles 18 and interwoven therewith or overlaid thereon to form a grid pattern. The scrim 14 is mostly open area, i.e., between the intersecting bundles 18, 20. While a grid-type scrim layer 14 has been described, other fiber and bundle orientations and dimensions could be utilized to form a fabric construction for the scrim layer 14. The scrim 14 may be made from a material, such as fiber glass, that has significant tensile strength and may function as a reinforcement for the other layers 12 and 16 of the radiant barrier 10. The reinforcement function of the scrim 14 may allow the radiant barrier 10 to resist tearing against fasteners like nails or staples when the radiant barrier 10 and/or the layers of roofing above and/or below pulls laterally, e.g., under the influence of gravity, wind or the weight of a workman. In accordance with one embodiment of the present disclosure, the layer 14 may be formed in a thickness of about 75 to about 100 microns. Alternatively, a more elastic material, such as polyester or a combination of glass and polyester scrim, and/or Kevlar, and/or polypropylene and/or polyethylene and/or combinations thereof, may be used to form the fibers of the scrim layer 14. Polyester fibers may be used in combination with glass fibers to make the scrim layer 14 or the scrim 14 may be made exclusively of polyester fibers. Alternatively, the scrim may be made from other known fibers, either natural or synthetic and/or combinations thereof.

A layer of aluminum foil 16, e.g. about 1 to 50 microns thick, in one embodiment, 3 to 11 microns thick, may be laminated to the layers 12, 14 to form the radiant barrier 10. The TPO layer 12 is resistant to penetration by air A and water W (liquid or vapor). The aluminum layer 16 is also air and water resistant, but in addition, is reflective of radiation R and reduces the transmission of radiation R through the radiant barrier 10. More particularly, the aluminum layer 16 may suppress the transmission of infrared radiation (heat) through the radiant barrier 10 by its reflectivity and emissivity. For example, a layer of aluminum 8 microns thick can exhibit an emissivity of 0.05 and a reflectivity of 80 or 86 relative to radiation in wavelengths in the range 250-2500 nm directed at a surface S at an incidence angle of 20 degrees. For this reason, when used as a roofing underlayment, the radiant barrier 10 may be used to prevent the transmission of solar energy through the roof and into the interior of a building on which it is installed. This barrier function can be utilized to reduce air conditioning loads and costs in hot climates. When used for this purpose, the barrier 10 may be installed with the aluminum layer facing out, closest to the sun, and the TPO layer 12 facing the roof decking. Alternatively, the radiant barrier 10 may be utilized on the underside (inside) of roof decking to retain heat in a structure, e.g., in cold climates. In this application, the radiant barrier 10 may be installed with the aluminum layer 16 facing the interior of the structure such that heat is radiated back into the structure before heating the scrim 14 and TPO layer 12. The installed orientation of the radiant barrier 10 may be adjusted to the application and the radiant barrier 10 may have a plurality of functions, e.g., to reject solar heat on hot days and to retain heat inside during cold days. Aluminum foil typically has one highly reflective surface and a matte finish on the opposite side. The shiny surface of the aluminum layer 16 may be disposed toward the source of radiation, e.g., the sun or the heat generated by a building's heating system, that is blocked by the radiant barrier 10.

As noted, the TPO layer 12 of the radiant barrier 10 is flexible and water resistant and the scrim layer 14 is provided to strengthen the radiant barrier 10 for installation and to prevent tears, e.g., at points where the radiant barrier is penetrated by fasteners, such as nails and staples. The combination of layers 12, 14, 16 also allows handling the radiant barrier 10 without it clinging to itself or bunching and deforming. The total thickness of the combination of layers 12, 14, 16 may be in the range of 130 to 200 microns, resulting in a barrier that is light in weight to facilitate shipping, handling and installation, that minimizes dead weight loads on a structure and which conserves raw materials, while retaining functionality.

Figure 3:
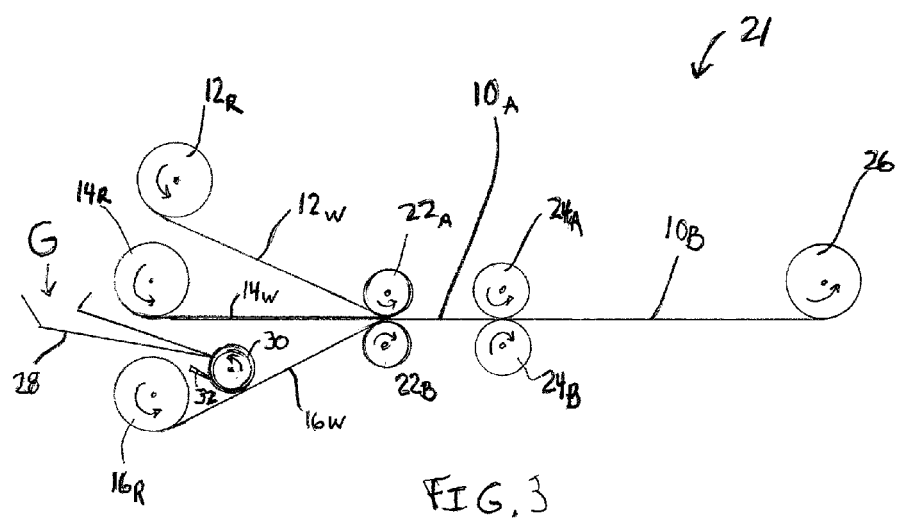
FIG. 3 is a diagrammatic view of an apparatus for forming a radiant barrier in accordance with one embodiment of the present disclosure.

FIG. 3 shows a manufacturing device 21 for forming the radiant barrier 10. Webs of TPO 12W, scrim 14W, and aluminum foil 16W are pulled from corresponding supply rolls 12R, 14R and 16R. The three webs 12W, 14W, 16W are drawn between rolls 22A, 22B, which converge and optionally press the three webs together to form a laminate configuration/structure. The rolls 22A, 22B may optionally be heated to bring the TPO layer 12 into a plastic, semi-plastic and/or partially tacky state, such that the pressure of the rolls 22A, 22B may be used to cause the three webs 12W, 14W, 16W to form a unitary structure 10A, which may represent the final radiant barrier 10. Alternatively, the rolls 22A, 22B may be guide rolls that position the webs 12W, 14W, 16W for introduction through a second set of rolls 24A, 24B, which may optionally be heated. In accordance with one embodiment, rolls 22A, 22B and 24A, 24B are spaced apart a progressively smaller distance, progressively exerting greater compressive force and/or reducing the thickness of the unitary structure 10A, e.g., to a second thickness state exhibited by unitary structure 10B, which may be the thickness of the final radiant barrier 10. The radiant barrier may be collected on take-up roll 26 or cut, folded and packaged. Optionally, a glue G (adhesive) may be fed into a glue dispenser 28 which deposits glue G on a spreader roll 30 in contact with one or more of the webs 12W, 14W, 16W. A doctor blade 32, brush or other glue controller may be used to strip the glue G from the spreader roll 30 or control the thickness of the glue G on the spreader roll 30, either prior to and/or after contacting the web 16W to which the glue G is applied. Alternatively, the glue G may be applied in other conventional ways, such as by spraying or brushing on and may be applied directly to one of the webs 12W, 14W, 16W. As a further alternative, the glue G may be provided as an extruded film which is interposed between the webs, e.g., 14W and 16W e.g., being fed by another roll (not shown). In accordance with one embodiment, the glue G is ethyl vinyl acetate (EVA), a water-proof, hot-melt adhesive. A glue G may be used, either alone or in conjunction with heated rolls, to merge the webs 12W, 14W, 16W together into a laminate structure 10B. Other compounds may be used for the glue G, including adhesive monomers or any polymer-modified adhesive. The width of the structure 10B may be cut to form rolls of material having a desired width.

A radiant barrier 10 of the form shown in FIGS. 1 and 2 having a total thickness of about 5 to 8 mil can satisfy the water vapor transmission standards of ASTM E96. With respect to reflectivity, the radiant barrier 10 described above has a reflectivity of 86 when subjected to radiation at an angle of 20 degrees. This allows a radiant barrier 10 in accordance with the present disclosure to pass the solar reflectance standard of ASTM C 1549. With respect to emissivity, the radiant barrier 10 described above had an emissivity of about 0.05 to 0.09 when exposed to radiation in the wavelengths of 250 to 2500 nm at an angle of about 20 degrees.

Figure 4:
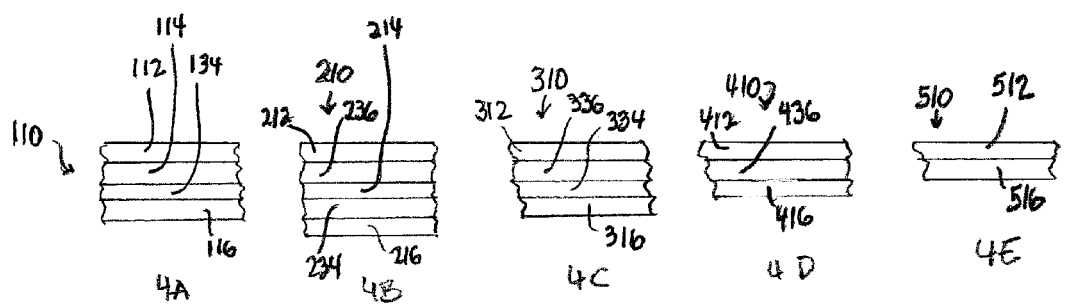
FIG. 4 is a plurality of diagrammatic cross-sectional views, 4A-4E, of radiant barriers in accordance with a plurality of embodiments of the present disclosure.

The radiant barrier 10 may have a different numbers of layers and a variety of different layers, as shown in FIG. 4. FIG. 4A shows an embodiment 110 having a TPO layer 112, a scrim 114 and an aluminum layer 116. The aluminum layer 116 is bound to the scrim 114 and TPO layer 112 by a layer of EVA 134. The layers 112, 114, 116 and 134 are shown in diagrammatic fashion and are not necessarily to scale. Exemplary dimensions for the TPO layer 112 would be in the range of 50 to 60 microns. Exemplary dimensions for the scrim layer 114 would be in the range of 75 to 100 microns. Exemplary dimensions for the aluminum layer 116 would be in the range of 5 to 8 microns. Exemplary dimensions for the EVA layer 134 would be in the range of 1 to 15 microns. In this embodiment, the EVA 134 exudes through the scrim 114 under the influence of heat and pressure, e.g., as exerted by heated rolls like rolls 24A, 24B of FIG. 3, which softens the EVA 134, causing the EVA 134 to become flowable and tacky and extend between and bind the TPO 112 and aluminum 116. The layer of EVA 134 aids in binding the layers 112, 114, 116 of the radiant barrier 110 together and resists de-lamination.

FIG. 4B shows an embodiment of the radiant barrier 210, which is similar to the embodiment shown in FIG. 4A in having a TPO layer 212, a scrim 214, an aluminum layer 216 and a layer of EVA 234. A layer 236 of low density polyethylene (LDPE) is interposed between the TPO layer 212 and the scrim 214. The LDPE layer 236 may be in the range of 5 to 15 microns thick and be laminated to or blended within a TPO layer 212 having a thickness in the range of 50 to 60 microns by passing through heated rolls, e.g., as shown by 24A, 24B of FIG. 3, which softens the TPO layer 212 and the LDPE layer 236 to the point where both are flowable under pressure and tacky, such that they stick to one another and/or mix in a ratio of about 10% to 25% LDPE to TPO, by volume. The inter-relationship and functionality of the scrim layer 214, EVA layer 234 and aluminum layer 216 are similar to those shown in FIG. 4A, described above.

The resultant radiant barrier 210 is significantly strengthened by the LDPE layer 236, e.g., the LDPE layer may increase the strength of the radiant barrier 210 by 50%. In addition, the LDPG layer 236 provides rupture resistance. For example, the radiant barrier 210 with an LDPE layer 236 would be 50% stronger than a radiant barrier 110 of comparable thickness, as measured by the amount of force needed to be exerted on the respective radiant barriers 110, 210 before tearing occurs.

FIG. 4C shows an embodiment 310 which is similar to the embodiment shown in FIG. 4B in having a TPO layer 312, an aluminum layer 316 and a layer of EVA 334. A layer 336 of low density polyethylene (LDPE) is interposed between the TPO layer 312 and the aluminum/EVA composite 316, 334. Alternatively, the TPO and LDPE can be mixed, e.g., under heat and pressure, to yield an intermixed layer. Because the LDPE layer 336 significantly improves the strength of the radiant barrier 310, while preserving flexibility, a scrim layer may be omitted for applications, which do not need the extra tear resistance conveyed by a scrim, such as scrim layer 214, as shown in FIG. 4B.

FIG. 4D shows another embodiment, wherein the radiant barrier 410 features only a TPO layer 412, an aluminum layer 416 and a layer 436 of low density polyethylene (LDPE) disposed there between. The aluminum layer 416 may be bound to the LDPE layer 436 by heat and pressure or, as an alternative, the aluminum layer 416 may be deposited on the surface of the LDPE layer 436 by vapor deposition, either before or after the lamination of the TPO layer 412 to the LDPE layer 436. Alternatively, the TPO and LDPE can be mixed, e.g., under heat and pressure, to yield an intermixed layer, on which the aluminum layer is deposited.

FIG. 4E shows another embodiment of the present disclosure, wherein the radiant barrier 510 features only a TPO layer 512 and an aluminum layer 516. The aluminum layer 516 may be formed separately as a foil, which is subsequently bound to the TPO layer 512 by heat and pressure or, as an alternative, may be deposited on the surface of the TPO layer 512 by vapor deposition. The radiant barrier 510 may be suitable for applications where minimal material strength and/or maximum flexibility are beneficial, such as when lining the interior surface of roof sheathing, or house wraps. In such applications, the TPO layer may be in the thickness range of 50 to about 70 microns. The aluminum layer 516 could have a thickness in the range of 5 to 11 microns.

It will be understood that the embodiments described herein are merely exemplary and that a person skilled in the art may make many variations and modifications without departing from the spirit and scope of the claimed subject matter. All such variations and modifications are intended to be included within the scope of the appended claims.

We claim:

1. A radiant barrier, consisting essentially of:
a laminate of a plurality of layers, including
a first layer of a flexible thermoplastic polyolefin (TPO) 50 to 70 microns thick;
a second layer of metallic aluminum 1 to 50 microns thick bonded to the first layer.

2. The radiant barrier of claim 1, further comprising a reinforcement layer disposed between the first layer and the second layer.

3. The radiant barrier of claim 2, wherein the reinforcement layer includes fiberglass.

4. The radiant barrier of claim 3, wherein the reinforcement layer further includes fibers made from at least one polymer.

5. The radiant barrier of claim 2 wherein the reinforcement layer contains fibers of at least two of fiberglass, polyester, polypropylene and Kevlar.

6. The radiant barrier of claim 2, wherein the reinforcement layer is 75 to 100 microns thick.

7. The radiant barrier of claim 2, further comprising a layer of ethyl vinyl acetate (EVA) interposed between at least two of the first layer, the second layer and the reinforcement layer.

8. The radiant barrier of claim 7, further comprising a layer of low density polyethylene (LDPE) interposed between at least two of the first layer, the second layer, the reinforcement layer and the EVA layer.

9. The radiant barrier of claim 8, wherein the layer of TPO and the layer of LDPE are mixed to form an intermixed layer.

10. The radiant barrier of claim 1, wherein the radiant barrier has an emissivity in the range of 0.01 to 0.09, a reflectivity of at least 80 at wavelengths of light in the range of 250 nm to 2500 um at an incidence angle of 20 degrees.

11. The radiant barrier of claim 1, further comprising a layer of adhesive interposed between the first and second layers to promote adhesion there between.

12. The radiant barrier of claim 1, wherein the radiant barrier is also a moisture barrier.

13. The radiant barrier of claim 1 wherein the aluminum layer has a matte surface and a reflective surface and the reflective surface is positioned in the laminate to face a source of radiation when the radiant barrier is installed on a structure.

14. A radiant barrier, comprising:
a laminate having
a first layer of a mixture of thermoplastic polyolefin (TPO) and low density polyethylene (LDPE);
a second layer of metallic aluminum bonded to the first layer, wherein the volume of low density polyethylene (LDPE) intermixed with the TPO is present in a percentage amount in the range of 10% to 25% by volume relative to the volume of TPO.

15. The radiant barrier of claim 14, wherein the second layer is applied to the first layer by vapor deposition.

16. The radiant barrier of claim 14, wherein the first layer is mixed by converging a layer of TPO and a layer of LDPE under heat and pressure.

17. The radiant barrier of claim 16, wherein the first layer and second layer are bonded by heat and pressure.

* * * * *